M. BACHEM.
METALLIC VEHICLE WHEEL.
APPLICATION FILED DEC. 17, 1914.

1,256,639.

Patented Feb. 19, 1918.

WITNESSES:
W. K. Ford
James P. Barry

INVENTOR
Maximillian Bachem
BY
ATTORNEYS

UNITED STATES PATENT OFFICE.

MAXIMILLIAN BACHEM, OF DETROIT, MICHIGAN.

METALLIC VEHICLE-WHEEL.

1,256,639.

Specification of Letters Patent.

Patented Feb. 19, 1918.

Application filed December 17, 1914. Serial No. 877,730.

*To all whom it may concern:*

Be it known that I, MAXIMILLIAN BACHEM, a subject of the King of Great Britain and Ireland, residing at Detroit, in the county of Wayne and State of Michigan, have invented certain new and useful Improvements in Metallic Vehicle-Wheels, of which the following is a specification, reference being had therein to the accompanying drawings.

The invention relates to metallic vehicle wheels and more particularly to constructions provided with demountable rims. It is the object of the invention to obtain a construction in which the anchorage or clamping connection for the demountable rim is engaged directly with the spoke of the wheel, and it is a further object to bring the points of bearing for the demountable rim in radial alinement with the spokes. With these objects in view the invention comprises the construction as hereinafter set forth.

Figure 1:
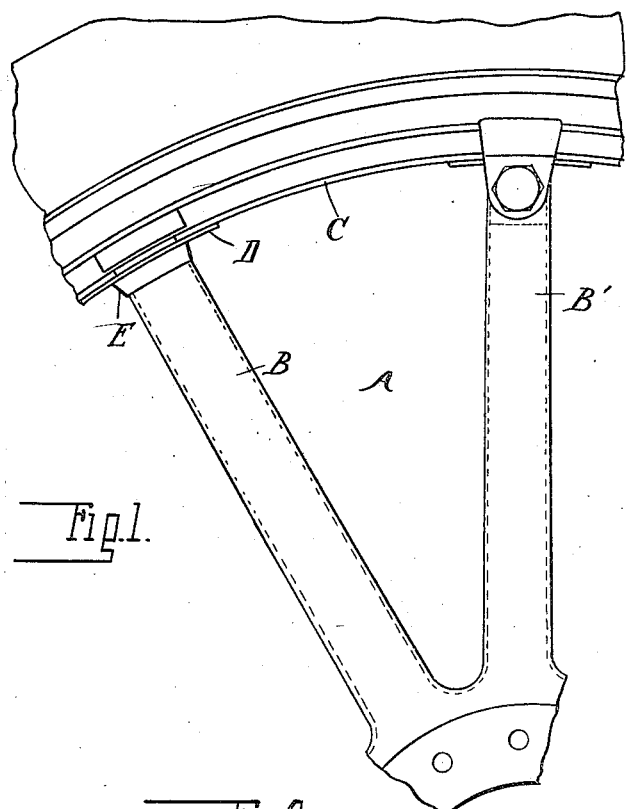
Figure 1 is an elevation showing a portion of a metallic vehicle wheel to which my improvements are applied.
Figure 2:
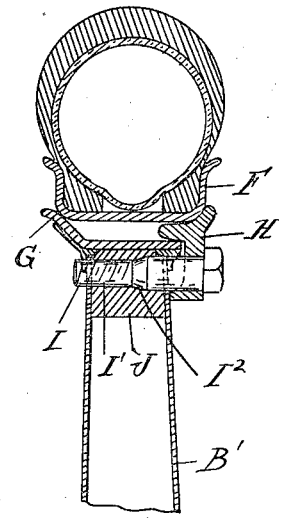
Fig. 2 is a cross section in the plane of one of the spokes to which the clamping bolt is secured.
Figure 4:
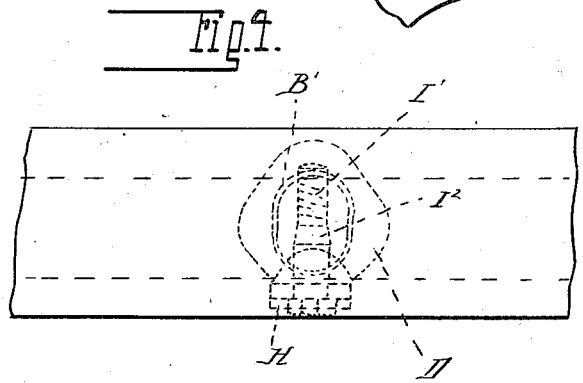
Fig. 4 is a plan view of a section of the rim showing in dotted lines the spoke and securing plate therefor.
Figure 3:
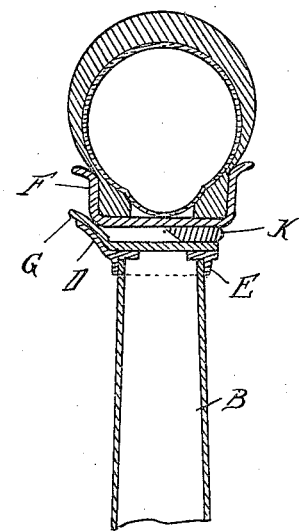
Fig. 3 is a similar view in the plane of an intermediate spoke showing the supporting bearing for the demountable rim.

In the present state of the art metallic vehicle wheels have been formed in which a center or spider section is formed of two complementary pressed steel members having their edges abutting and welded or otherwise secured to each other. There is also a metallic rim which is connected to the ends of the hollow spokes formed on the spider section by flanged members welded or otherwise secured to both spoke and rim. Demountable rims have usually been heretofore applied to wheels having wooden fellies, and the clamping bolts for securing these rims have been arranged in the fellies at points intermediate of adjacent spokes. Also the bearings which form the supports for the demountable rim upon the felly have in a certain type of construction been arranged at distributed points about the felly, said points being also intermediate of the spokes. With the present construction a demountable rim is applied to a metallic wheel and is secured by bolts directly engaging the spokes, which latter are reinforced as hereinafter set forth.

In detail, A is the metallic spider section having the hollow tapering spokes B B' etc. C is a metallic rim which is secured to the ends of the spokes B B' by flanged fittings D having nipple portions E for surrounding the spoke, the flanges being spot-welded or otherwise secured to the rim. F is a demountable rim, one edge of which is supported upon an inclined flange G of the permanent rim, while the opposite edge is supported by detachable wedges H secured by clamping bolts I.

Inasmuch as the wheel is provided with a metallic permanent rim in place of a wooden felly, it is impossible to engage the clamping bolts I intermediate of the spokes without the provision of special fittings. To avoid this expense I have so constructed the spokes that the bolts I may be directly engaged therewith. This I have accomplished by placing within the end portions of several of the spokes filler plugs J, which form reinforcements, and are apertured and threaded for engagement of the bolt. As shown the bolt I has its threaded portion I' of smaller diameter than its shank portion, with a tapering intermediate portion $I^2$ which engages a corresponding tapering seat in the aperture in the plug.

As the number of clamping bolts is less than the number of bearings required for radially supporting the demountable rim a certain number of intermediate spokes, preferably each alternate spoke, are arranged in alinement with tapering bearings K secured to the demountable rim, and the arrangement is such that when the demountable rim is in place it will be radially supported in alinement with the spokes. Thus in use, the shocks to which the tire on the wheel is subjected will be transmitted directly to the spokes instead of through the laterally-extending portion of the felly, as with the wooden wheels.

What I claim as my invention is:—

1. In a metallic wheel, hollow, thin-walled radial spokes, a continuous fixed rim integrally joined to and with the outer ends of the spokes, alternate spokes being filled at their outer ends and provided through said fillings with transverse openings adapted to receive rim-clamping bolts and said fixed rim being provided at one side with a demountable rim abutment.

2. In a metallic vehicle wheel, hollow, thin-walled radial spokes, a fixed rim surrounding the outer ends of said spokes and integrally connected therewith, the outer end of each alternate spoke being filled with a plug integrally joining the rim and spoke, and said alternate spokes being provided in their outer solid ends with transverse threaded openings adapted to receive bolts for clamping a demountable rim upon the wheel, said fixed rim being provided with a rim-receiving abutment at one side.

3. In a metallic wheel of the bolted-on demountable rim type, a metallic wheel proper having thin-walled hollow spokes, and a fixed rim welded to and upon the outer ends of the spokes, each of said spokes having an outwardly-extending circumferential flange at its outer end strengthening the spoke and the joint between the spoke and fixed rim and some of said spokes having transverse holes at their outer ends for receiving rim-clamping bolts.

4. An automobile wheel comprising a metallic wheel proper having hollow spokes, and a metallic fixed rim upon the outer ends of the spokes and welded thereto, each alternate spoke being provided with a transverse opening adapted to receive a rim-clamping bolt, said fixed rim being provided at one side with a demountable rim abutment, a demountable rim seated on said abutment and of an inner diameter providing a circumferential slot between the fixed rim and demountable rim, wedge lugs arranged between the two rims and held in position by bolts in said bolt holes, and rim supporting projections arranged between the demountable rim and the fixed rim and supporting the demountable rim at points adjacent to the outer ends of the alternate spokes.

5. In a metallic wheel of the bolted-on demountable rim type, a metallic hub and a fixed rim, hollow spokes connecting the rim and hub, the spokes being reinforced at their outer ends by means of circumferential outwardly-extending flanges, and alternate spokes being also internally reinforced at their outer ends and provided with transverse openings for rim-clamping bolts and extending through said internal reinforcements.

6. In a metallic wheel of the bolted-on demountable rim type, a metallic wheel proper having thin-walled hollow spokes, and a flanged fixed rim welded to and upon the outer ends of the spokes, each of said spokes having an outwardly extending circumferential flange at its outer end strengthening the spoke and the joint between the spoke and fixed rim, and some of said spokes having threaded bolt holes at their outer ends for receiving rim-clamping bolts.

7. A rim of the herein described bolted-on type, in combination with a complementary metallic wheel comprising tubular spokes, a relatively thin metallic fixed rim metallically united with and to the ends of all of the spokes, wedging rim clamps secured upon the outer ends of some of the spokes, and a rim support or stud in substantial alinement with each of the other spokes.

8. A rim of the herein described bolted-on type, in combination with a metallic wheel having tubular spokes and a continuous welded on fixed rim, a circumferential space being provided between the rim and fixed rim, and rim supports in said space one in alinement with each said spoke.

9. A metallic vehicle wheel comprising a hub, a metallic fixed rim and metallic hollow spokes extending from the hub to the rim, the outer ends of the spokes being welded to and with the rim, some of the spokes being provided with transverse holes for receiving demountable rim-clamping bolts, and the fixed rim being provided with means at one side to support a demountable rim.

10. In a metallic wheel having hollow metallic spokes, a metallic fixed rim welded to the ends of all of the spokes, some of the spokes being reinforced at their outer ends and provided with transverse openings adapted to receive rim clamping bolts.

11. The combination with a wheel having a metallic spider formed with hollow spokes and a metallic rim secured to the outer ends of said spokes, of a demountable rim, laterally-extending threaded members for clamping said demountable rim, and reinforcements for the ends of the spokes constituting the securing means for said members.

In testimony whereof I affix my signature in presence of two witnesses.

MAXIMILLIAN BACHEM.

Witnesses:
JAMES WHITTEMORE,
ADELAIDE I. ADAMS.